(12) United States Patent
Burks et al.

(10) Patent No.: US 11,215,709 B2
(45) Date of Patent: Jan. 4, 2022

(54) AUDIO DATA GATHER

(71) Applicant: HEWLETT-PACKARD DEVELOPMENT COMPANY, L.P., Houston, TX (US)

(72) Inventors: Ricky Thomas Burks, Houston, TX (US); Xiang Ma, Houston, TX (US); Alan Man Pan Tam, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 686 days.

(21) Appl. No.: 16/076,459

(22) PCT Filed: Apr. 21, 2017

(86) PCT No.: PCT/US2017/028876
§ 371 (c)(1),
(2) Date: Aug. 8, 2018

(87) PCT Pub. No.: WO2018/194661
PCT Pub. Date: Oct. 25, 2018

(65) Prior Publication Data
US 2021/0181340 A1    Jun. 17, 2021

(51) Int. Cl.
| | | |
|---|---|---|
| *G01S 15/66* | (2006.01) | |
| *G01S 15/08* | (2006.01) | |
| *G01S 15/86* | (2020.01) | |
| *G01S 17/08* | (2006.01) | |
| *H04R 3/00* | (2006.01) | |

(52) U.S. Cl.
CPC .............. *G01S 15/86* (2020.01); *G01S 15/08* (2013.01); *G01S 17/08* (2013.01); *H04R 3/005* (2013.01)

(58) Field of Classification Search
CPC .......... G01S 15/86; G01S 17/08; G01S 15/08; H04R 3/005
USPC ......................................................... 367/99
See application file for complete search history.

(56) References Cited

U.S. PATENT DOCUMENTS

| | | |
|---|---|---|
| 8,761,412 B2 | 6/2014 | Hernandez-abrego et al. |
| 9,525,938 B2 | 12/2016 | Deshpande et al. |
| 2011/0003614 A1 | 1/2011 | Langereis et al. |
| 2013/0035040 A1 | 2/2013 | Terlizzi |
| 2013/0158711 A1 | 6/2013 | Smith et al. |
| 2014/0184796 A1 | 7/2014 | Klein et al. |
| 2016/0203709 A1 | 7/2016 | Alameh et al. |

FOREIGN PATENT DOCUMENTS

| | | |
|---|---|---|
| WO | 2006121896 A2 | 11/2006 |
| WO | 2016190997 A1 | 12/2016 |

OTHER PUBLICATIONS

Basu et al., "Vision-Steered Audio for Interactive Environments", M.I.T Media Laboratory Perceptual Computing Section Technical Report No. 373, 1996, 6 Pages.

*Primary Examiner* — Daniel L Murphy
(74) *Attorney, Agent, or Firm* — Brooks, Cameron and Huebsch PLLC

(57) ABSTRACT

Example implementations relate to gathering audio data. For example, a system can include a range sensor to determine a location and distance of an object. The system can include a microphone to gather audio data at the location and from within a threshold proximity of the object. The system can include a computing device to determine a portion of audio data outside the threshold proximity of the object to remove.

14 Claims, 4 Drawing Sheets

AUDIO DATA GATHER

BACKGROUND

Computing devices may use listening devices, such as microphones, to detect sound. Microphones can be configured to detect sound from a fixed area. In some instances, unintended background noises are also captured and may interfere with the intended noises of users using the computing devices. The resultant audio signal can be degraded and more difficult to determine which noises are useful and/or intended for the computing devices to receive.

DETAILED DESCRIPTION

Computing devices can be used to detect audio data. Audio data can include speech, sounds, conversation, etc. between users of an application of the computing device. A user can refer to a person using an application of a computing device. A user can refer to a person participating in an application run on the computing device. Audio data from the user interacting with the computing device may be intended to be received by the computing device while additional background noise may be received unintentionally. The unintended background noise can interfere with the intended user audio data. Filtering out the background noise from the user audio data can increase clarity of the audio data received and processed by the computing device.

In order to increase audio data clarity, audio data associated with the location and/or distance of the user can be gathered while audio data not associated with the location and/or distance can be filtered out. For example, a proximity threshold around a user can be created in order to receive audio data within the proximity threshold and filter out audio data outside the proximity threshold.

In some examples, a user can move from an area where audio data is gathered to a filtered area (e.g., outside a proximity threshold) where background noise is filtered out. As the user moves to the filtered area, the audio data of the user can go from being gathered to being filtered out, which can disrupt a phone call or other audio scenario, Updating a location and/or distance of the user can prevent audio data from being lost as the user moves.

A range sensor can be used to detect an object, such as a user, near the computing device for receiving audio data. A range sensor can sense a location and/or a distance of the object. A range sensor can include a time-of-flight sensor, an audio-based range sensor, an optically-based range sensor, etc. A range sensor can be used to gather location and/or distance information of an object without gathering visual, optical, or image-based data of the object. In this way, an increase in privacy can be maintained while gathering the location and/or distance data.

Figure 1:
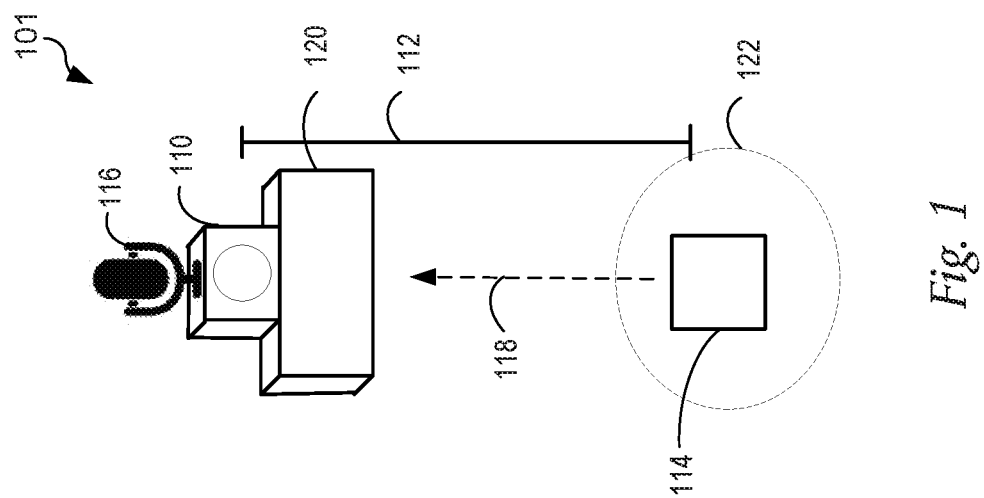
FIG. 1 illustrates an example of a system for gathering audio data consistent with the disclosure.

Examples of the disclosure include apparatuses, systems, and methods for gathering audio data. In some examples, a system may include a range sensor for detecting a location and/or distance of an object. The system may include a microphone for gathering the audio data. The system may include a computing device for determining which audio data to gather and which audio data to filter out, FIG. 1 illustrates an example of a system 101 for gathering audio data consistent with the disclosure. As illustrated in FIG. 1, the system 101 can include a range sensor 110. The range sensor 110 can be used to detect a location of an object 114. The range sensor 110 can be used to detect a distance 112 of the object 114. The range sensor 110 can be a time-of-flight (TOF) sensor. The TOF sensor can resolve distance based on a known speed of data (e.g., speed of light, etc.).

The TOF sensor can include an infra-red (IR) sensor and an IR emitter in a single small package. The IR emitter can emit data outward, the data can bounce off of an object, and the data that is bounced back can be received by the IR sensor. The time-of-flight sensor can determine a time from when the data left to when the data is received back. The determined time can indicate a location of an object 114, The determined time can indicate a distance 112 of an object 114, While a single object is illustrated in FIG. 1, examples are not so limited, as will be described in association with FIG. 2.

The range sensor 110 can increase privacy by not collecting images of the object 114 and/or not recording video data of the object 114, The range sensor 110 can determine a location and/or distance data independent of gathering additional optical or image data, Decreasing the amount of data gathered by the range sensor 110 can decrease an amount of processing power and/or data processing time in order to reduce power consumption and data processing resources used. The range sensor 110 can be an optically-based range sensor that uses optically-based data to determine the location and distance. The range sensor 110 can be an audio-based range sensor that uses audio data to determine the location and distance.

The system 101 can include a microphone 116 to gather audio data 118 from the object 114. In some examples, the microphone 116 can be in close proximity to the range sensor 110, as illustrated in FIG. 1. In some examples, the microphone 116 can be located at a location between the range sensor 110 and the object 114. In some examples, the microphone 116 can be a same distance from the range sensor 110 as the object 114. The system 101 can include a computing device 120. The computing device 120 can collect the audio data 118 from the object 114 and process the audio data 118.

In some examples, the microphone 116 can gather audio data 118 from the object 114 in addition to gathering audio data from other sources. For example, the microphone 116 can gather audio data 118 from an object 114, such as a first user, and gather additional audio data from a second user. The audio data 118 of the first user may be intended for use with an application (such as a phone call, a skype conference, etc.) on the computing device 120 but the audio data gathered from the second user may not be intended for the application.

The computing device 120 can determine a threshold proximity 122 based on the location of the object 114 and the distance 112 of the object 114 from the range sensor 110. For example, a defined area surrounding the object 114 can be a threshold proximity 122 around the object 114. Additional audio data gathered outside the threshold proximity 122 can be filtered out of the audio signals. While FIG. 1 illustrates a single object 114 for gathering audio data from, examples are not so limited. For example, audio data can be collected from any number of objects. However, additional objects can use a modified proximity to gather audio data from, as described further in association with FIG. 2.

Figure 2:
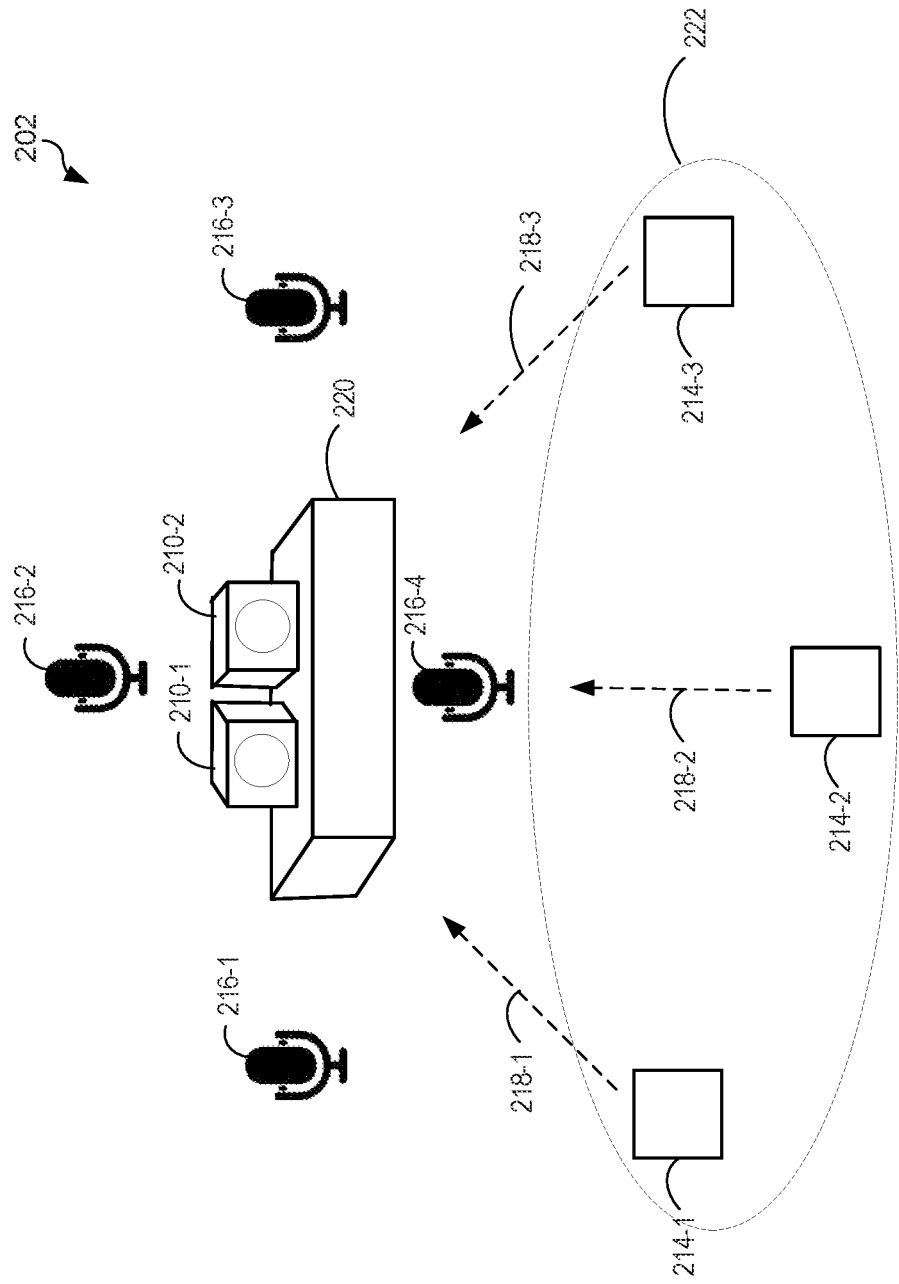
FIG. 2 illustrates an example of an apparatus for gathering audio data consistent with the disclosure.

FIG. 2 illustrates an example of a system 202 for gathering audio data consistent with the disclosure. As illustrated in FIG. 2, the system 202 can include range sensors 210-1, 210-2, referred to herein as range sensors 210. The range sensors 210 can be used to detect a location of objects 214-1, 214-2, 214-3, referred to herein as objects 214. The range sensors 210 can be used to detect distances each associated with one of the objects 214. At least one of the range sensors 210 can be a time-of-flight (TOF) sensor.

The TOF sensor can resolve distance based on a known speed of data (e.g., speed of light, etc.). The TOF sensor can include an infra-red (IR) sensor and an IR emitter in a single small package. The IR emitter can emit data outward, the data can bounce off of an object, and the data that is bounced back can be received by the IR sensor. The time-of-flight sensor can determine a time from when the data left to when the data is received back. The determined time can indicate a location of a corresponding one of the objects 214. The determined time can indicate a distance of the one of the objects 214 from the TOF sensor.

A first range sensor 210-1 can be directed in a first direction. The second range sensor 210-2 can be directed in a second direction that is a particular number of degrees from the first direction. For example, the second range sensor 210-2 can be directed in a second direction that is offset 27 degrees from the first direction. The first range sensor 210-1 and the second range sensor 210-2 can be directed in a direction on a line that is encompassed within the same plane as each other, irrespective of their position in relation to objects 214 (such as users). The first and second range sensors 210-1, 210-2 can be directed any number of degrees offset from one another. In this way, each of the range sensors 210 can cover a particular portion of a radius surrounding the computing device 220 to detect objects within the radius surrounding the computing device 220. While two range sensors 210-1, 210-2 are illustrates, examples are not so limited. For example, range sensors can be positioned to surround a 360 degree radius around the computing device 220, or a portion thereof.

The range sensors 210 can each increase privacy by not collecting images of the objects 214 and/or not recording video data of the objects 214. The range sensors 210 can determine a location and/or distance data only. Decreasing the amount of data gathered by the range sensors 210 can decrease an amount of processing power and/or data processing time in order to reduce power consumption and data processing resources used. The range sensors 210 can each be an optically-based range sensor that uses optically-based data to determine the location and distance. The range sensors 210 can each be an audio-based range sensor that uses audio data to determine the location and distance.

The system 202 can include microphones 216-1, 216-2, 216-3, 216-4, referred to herein as microphones 216, to gather audio data 218-1, 218-2, 218-3 from each of the objects 214-1, 214-2, 214-3, respectively. In some examples, the microphones 216 can be in close proximity to the range sensors 210, as illustrated in FIG. 2. In some examples, the microphones 216 can be located at a location between the range sensors 210 and the objects 214. In some examples, the microphones 216 can be a same distance from the range sensors 210 as the objects 214. In some examples, the microphones 216 can be intermittently spaced around the range sensors 210 at different distances to gather audio data at different points in space. The system 202 can include a computing device 220. The computing device 220 can gather the audio data 218 from the objects 214 and process the audio data 218.

The microphones 216 can be used in conjunction with the range sensors 210 to determine more particular locations of objects 214 and determine more particular locations of where audio data is being received from. By using the multiple locations of the microphones 216 and the objects 214, co-localizing techniques can be used to further enhance determining where the audio data is originating and filtering out other audio data not associated with a particular scenario (e.g., a phone call, a skype call, a conference call, etc.). Co-localizing techniques can include using the different locations and angle positions of each of the microphones 216 in relation to each of the object 214 and geometrically calculate based on each location and position where the object 214 is located.

In some examples, the microphones 216 can gather audio data 218 from the objects 214 in addition to gathering audio data from other sources. For example, the microphones 216 can gather audio data 218 from the objects 214-1, 214-2, 214-3, such as a first group of users, and gather additional audio data from a second group of users (not illustrated). The audio data 218 of the first group of users may be intended for use with an application (such as a phone call, a skype conference, etc.) on the computing device 220 but the audio data gathered from the second group of users may not be intended for the application.

The computing device 220 can determine a threshold proximity 222 based on the location of the objects 214 and the distances of each of the objects 214 from the range sensors 210. For example, a defined area surrounding the objects 214 can be a threshold proximity 222 around the objects 214. Additional audio data gathered outside the threshold proximity 222 can be filtered out of the audio signals. As additional objects are detected by the range sensors 210 and are determined to be a particular distance from the range sensors 210 that indicates the objects should be part of the audio processing, the threshold proximity 222 can be enlarged to include the additional objects. As audio signals from additional objects determined to be a distance that indicates that the additional objects should not be part of the audio processing, the threshold proximity 222 can remain the same size and audio data from the additional objects can be filtered out.

Figure 3:
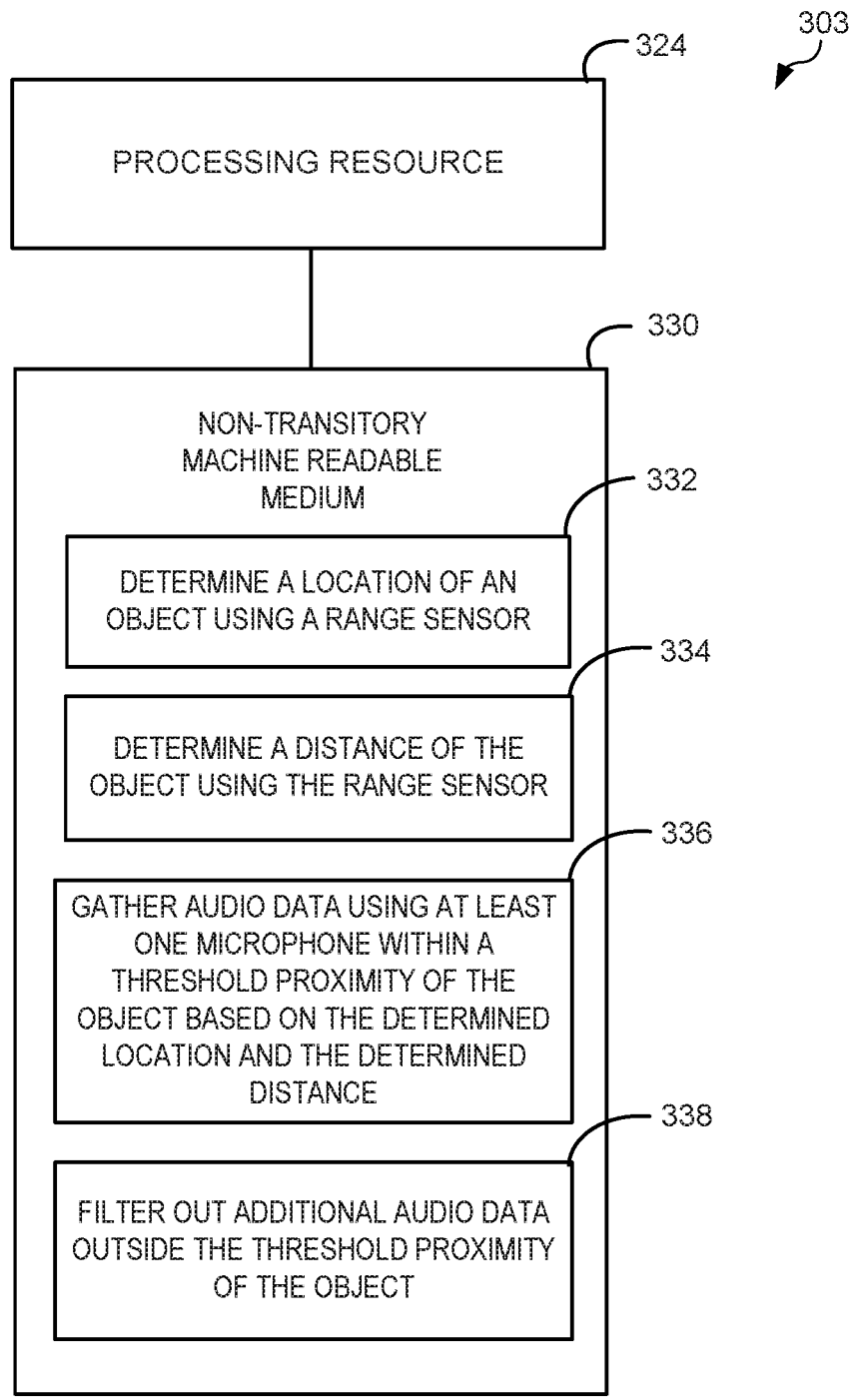
FIG. 3 illustrates a diagram of an example of a non-transitory computer readable medium and processing resource for gathering audio data consistent with the disclosure.

FIG. 3 illustrates a diagram 303 of an example of a non-transitory computer readable medium 330 and processing resource 324 for gathering audio data consistent with the disclosure. In some examples, the processing resource(s) 324 may process and/or control audio data received from objects (such as objects 114 in FIGS. 1 and 214 in FIG. 2). A memory resource can be used to store instructions executed by the processing resource 324 to perform operations as described herein. A processing resource 324 may execute instructions stored on the non-transitory machine readable medium 330. The non-transitory machine readable medium 330 may be any type of volatile or non-volatile memory or storage, such as random access memory (RAM), flash memory, read-only memory (ROM), storage volumes, a hard disk, or a combination thereof.

The example medium 330 may store instructions 332 executable by a processing resource 324 to determine a location of an object using a range sensor. The example medium 330 may store instructions executable by the processing resource 324 to determine additional locations of additional objects and additional distances of the additional objects. That is, the instructions can be executable to continue to monitor, using the range sensor, for additional objects that may enter and/or exit the detection area of the range sensor.

The example medium 330 may store instructions 334 executable by a processing resource 324 to determine a distance of the object using the range sensor. The instructions may be executable by the processing resource 324 to determine distances of additional detected objects.

The example medium 330 may store instructions 336 executable by a processing resource 324 to gather audio data using at least one microphone within a threshold proximity of the object based on the determined location and the determined distance. The medium 330 may store instructions executable by the processing resource 324 to automatically change the threshold proximity based on the additional detected locations of objects. This can avoid using a manual setting to change the threshold proximity as the user may not know the best manual setting, the user may not know where the manual setting is located, etc.

The medium 330 may store instructions executable by the processing resource 324 to automatically change a location where audio is gathered (e.g., modify the threshold proximity) based on detecting movement of the object. As the object moves toward a boundary of the threshold proximity, in response to a determination that the audio data of the object should still be gathered, the threshold proximity can be enlarged to continue to include the object. Likewise, as additional users move toward the boundary of the threshold proximity, the threshold proximity can be enlarged to include objects that are determined to be associated with the scenario of the audio data (e.g., phone call, skype call, etc.).

In addition, as the object moves further outside a particular distance of the threshold proximity, the audio data from the moved object may be determined to be filtered out as the audio data is less useful. For example, as a user on a phone call is within a particular distance, the voice of the user may be determined to be associated with the phone call. However, as the user moves outside a particular distance, the user may be determined to be off the call and the audio data from the user may be associated with a different scenario, different user, different interaction, etc. than the phone call.

In some examples, as objects move closer together, the threshold proximity can be decreased in size. For example, if objects move closer together and create space around them that are no longer occupied by other objects, the threshold proximity can shrink to include the objects but no additional space outside the locations of the objects. In this way, gathering of the audio data can be further fine-tuned and extraneous audio data outside that smaller threshold proximity can be avoided.

The example medium 330 may store instructions 338 executable by a processing resource 324 to filter out additional audio data outside the threshold proximity of the object. The medium 330 may store instructions executable by the processing resource 324 to gather updated audio data. For example, adding additional objects into the threshold proximity can include updating audio data to gather additional audio data not gathered prior to adding the additional objects.

The medium 330 may store instructions executable by the processing resource 324 to filter out updated audio data based on the changed threshold proximity. For example, updated audio data may include audio data from objects that were not originally providing audio data and that are outside the threshold proximity. The updated audio data gathered from locations outside the threshold proximity can be filtered out. The location that the data is received from can be determined based on microphones located at multiple locations that allow for determinations of where the audio is originating.

Figure 4:
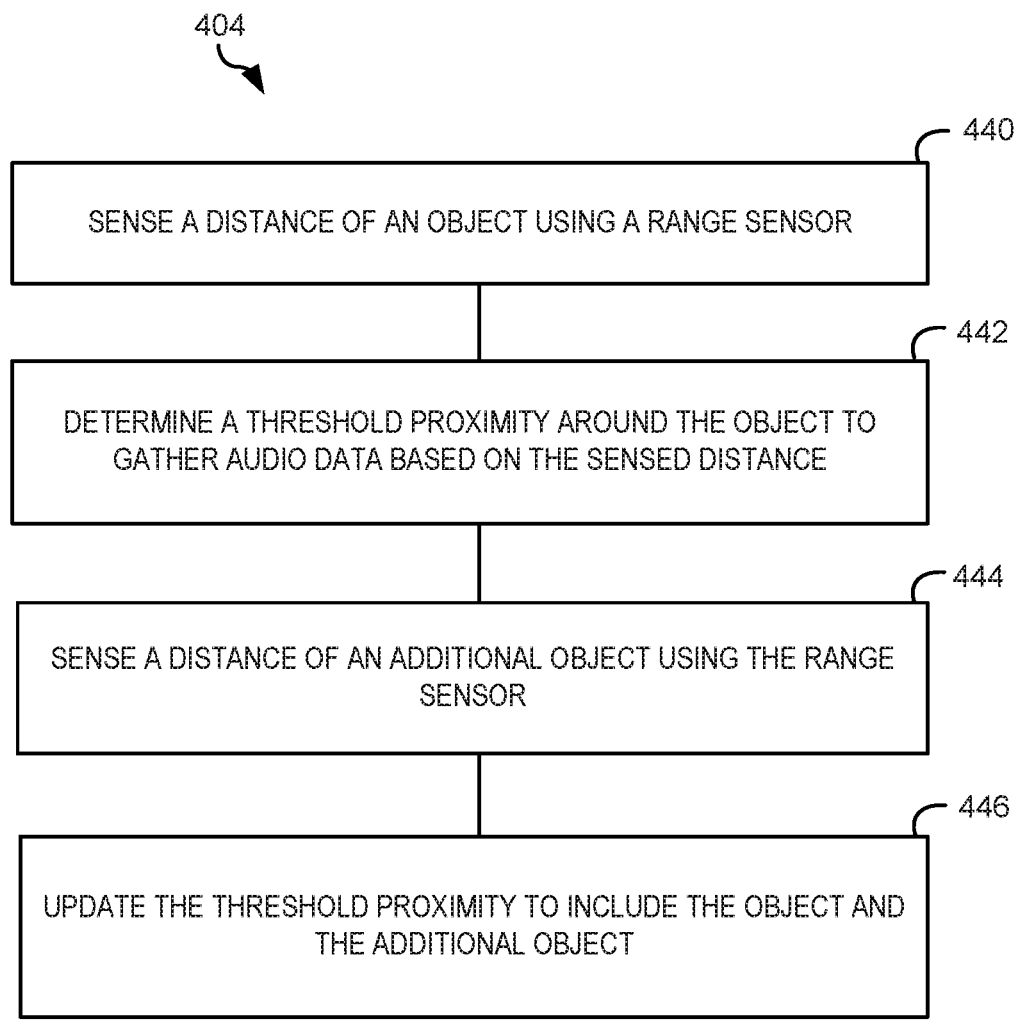
FIG. 4 illustrates a flow diagram for an example of a method for gathering audio data consistent with the disclosure.

FIG. 4 illustrates a flow diagram for an example of a method 404 for gathering audio data consistent with the disclosure. At 440, the method 404 includes sensing a distance of an object using a range sensor. The range sensor can include a time-of-flight (TOF) sensor. The range sensor can be mounted on a computing device, on a table, in front of the computing device, placed at multiple locations within a room, etc. Based on where the TOF sensor is located, the TOF sensor can determine a particular location of a number of users near the TOF sensor. For example, a TOF sensor may be directed or pointed at a region in a room and able to gather data associated with that region. When a user is within that region, the TOF sensor can sense a distance of the user in that region.

At 442, the method 404 can include determining a threshold proximity around the object to gather audio data based on the sensed distance. For example, if a user is 10 feet in front of the TOF sensor, a threshold proximity can be centered around that 10 foot location. The threshold proximity can be a particular distance around the location of the user. For example, a 4 foot diameter circle around the user may be determined for the threshold proximity such that audio data 10 feet from the range sensor and within 2 feet of that 10 foot location is gathered. Audio data outside that threshold proximity of the user can be filtered out and not used for processing of the audio data.

At 444, the method 404 can include sensing a distance of an additional object using the range sensor. As additional users move in and out of a sensing region of the range sensor, the users can be determined to either be a part of the application that is running on a computing device (i.e., part of a phone call, skype call, etc.) or not be a part of that application. If the additional user is a particular distance from the range sensor and/or a particular distance from the initially sensed user, the additional user may be determined to be a part of that application running of the computing device. As audio data from the additional users are added into and filtered out of the audio data associated with the application, audio data can be dynamically refined to provide a clearer sound associated with the application.

At 446, the method 404 can include updating the threshold proximity to include the object and the additional object. That is, the audio data of the initially located user and the audio data of the subsequently located additional user can be combined for the application as the initial user and the additional user would be within the updated threshold proximity for audio data gathering. In this way, audio data most relevant to the application can be gathered and audio data less relevant to the application can be filtered out.

The method can include using range sensors to determine the location and the distance of the users to avoid gathering images and/or video data of the users. The privacy of the users can be maintained by using a range sensor to locate the user rather than a camera, optical-based image acquisition, etc. The range sensor can gather location and distance data that can be subsequently discarded or at least not able to identify or monitor the users.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A system, comprising:
a range sensor to determine a location and distance of an object from the range sensor;
a plurality of microphones to gather audio data from a plurality of locations; and
a computing device to:
determine a threshold proximity of the object, wherein the threshold proximity is a defined area around the location and distance of the object; and
remove a portion of the audio data that is determined to be received from a location outside the threshold proximity of the object, wherein the portion of audio data is received from an area that is outside the defined area around the location and distance of the object.

2. The system of claim 1, wherein the range sensor is a time-of-flight (TOF) sensor.

3. The system of claim 2, wherein the TOF sensor comprises an infra-red (IR) LED emitter.

4. The system of claim 1, wherein the range sensor is an optical-based range sensor.

5. The system of claim 1, wherein the range sensor is an audio-based range sensor.

6. The system of claim 1, further comprising a plurality of range sensors directed at different locations around the system.

7. A non-transitory computer readable medium storing instructions executable by a processing resource to:
determine a location of an object using a range sensor;
determine a distance of the object from the range sensor using the range sensor;
gather audio data using a plurality of microphones at a plurality of locations;
determine a threshold proximity of the object, wherein the threshold proximity is a defined area around the location and distance of the object from the range sensor; and
filter out a portion of the audio data that is received from a location outside the threshold proximity of the object.

8. The non-transitory computer readable medium of claim 7, wherein the instructions are executable by the processing resource to determine additional locations of additional objects and additional distances of the additional objects.

9. The non-transitory computer readable medium of claim 8, wherein the instructions are executable by the processing resource to change the threshold proximity based on the additional locations.

10. The non-transitory computer readable medium of claim 9, wherein the instructions are executable by the processing resource to gather updated audio data and to filter out updated audio data based on the changed threshold proximity.

11. The non-transitory computer readable medium of claim 7, wherein the instructions are executable by the processing resource to automatically change a location where audio is gathered based on detecting movement of the object.

12. A method, comprising:
sensing a distance of an object from a range sensor using the range sensor;
determining a threshold proximity around the object to gather audio data based on the sensed distance, wherein the threshold proximity is a defined area around the distance of the object;
sensing a distance of an additional object from the range sensor using the range sensor;
updating the threshold proximity to include the object and the additional object; and
removing a portion of the audio data that is determined to be received from a location outside the threshold proximity of the object and the additional object, wherein the portion of audio data is received from an area that is outside the defined area around the distance of the object and the distance of the additional object.

13. The method of claim 12, further comprising sensing a distance of each of a plurality of objects using a plurality of range sensors, wherein the plurality of range sensors are positioned on a same plane at a sensing location.

14. The method of claim 12, further comprising positioning a plurality of range sensors every 27 degrees around a sensing location to cover up to 360 degrees around the sensing location.

* * * * *